(12) United States Patent
Nelson (10) Patent No.: US 11,678,650 B2
(45) Date of Patent: Jun. 20, 2023

(54) DISTRIBUTION DEVICE

(71) Applicant: Tim Swenson, Marshall, MN (US)

(72) Inventor: Darren Nelson, Marshall, MN (US)

(*) Notice: Subject to any disclaimer, the term of this patent is extended or adjusted under 35 U.S.C. 154(b) by 333 days.

(21) Appl. No.: 16/167,594

(22) Filed: Oct. 23, 2018

(65) Prior Publication Data

US 2020/0120904 A1   Apr. 23, 2020

(51) Int. Cl.
  *A01K 61/80* (2017.01)
  *A01K 61/59* (2017.01)
  *A22C 29/02* (2006.01)
  *A01K 61/85* (2017.01)
  *A01K 5/02* (2006.01)
  *A01K 63/04* (2006.01)

(52) U.S. Cl.
  CPC ............ *A01K 61/59* (2017.01); *A01K 5/0266* (2013.01); *A01K 5/0275* (2013.01); *A01K 61/80* (2017.01); *A01K 61/85* (2017.01); *A22C 29/023* (2013.01); *A01K 63/04* (2013.01)

(58) Field of Classification Search
  CPC .. A01K 5/0241; A01K 5/0266; A01K 5/0275; A01K 61/80; A01K 61/85
  USPC ... 119/51.04, 56.2, 57.6, 210, 212, 230, 242
  See application file for complete search history.

(56) References Cited

U.S. PATENT DOCUMENTS

| | | | | |
|---|---|---|---|---|
| 3,695,415 A * | 10/1972 | Bakker | ............... | A01K 5/0208 198/371.2 |
| 4,223,638 A * | 9/1980 | Sappington | .......... | A01K 5/0258 119/57.6 |
| 4,811,675 A * | 3/1989 | Segalla | .................. | A01K 39/01 119/57.6 |
| 4,981,107 A * | 1/1991 | Beaudoin | ............. | A01K 5/0208 119/56.2 |
| 5,069,165 A * | 12/1991 | Rousseau | ............. | A01K 5/0266 119/57.6 |
| 5,076,215 A * | 12/1991 | Yang | ...................... | A01K 61/80 119/51.04 |
| 5,377,624 A | 1/1995 | Craig | | |
| 5,505,160 A * | 4/1996 | Pellerin | ................ | A01K 5/0266 119/57.1 |
| 6,234,111 B1 * | 5/2001 | Ulman | ................... | A01K 1/031 119/51.02 |
| 6,305,323 B1 | 10/2001 | Tsai | | |
| 6,779,486 B2 * | 8/2004 | Vaags | ................. | A01K 5/0266 119/51.11 |
| 2006/0124071 A1 | 6/2006 | Campbell | | |
| 2014/0168411 A1 | 6/2014 | Leder | | |

FOREIGN PATENT DOCUMENTS

| | | |
|---|---|---|
| CN | 2682930 | 3/2005 |
| CN | 205213882 | 5/2016 |
| WO | WO2016077928 | 5/2016 |

* cited by examiner

*Primary Examiner* — David J Parsley (57) ABSTRACT

A distribution device automates and meters distribution of feed in a commercial shrimp production facility utilizing a stacked shallow tank configuration. The device includes an elongated support surface positioned over and extending along an elongated tank having an open top. A shuttle moves along the support surface to move along a length of the tank. A hopper to hold feed is coupled to the shuttle. A spreader is in environmental communication with the hopper to distribute feed from the hopper and a meter is operationally coupled between the hopper and the spreader for controlling an amount of the feed delivered to and distributed by the spreader.

17 Claims, 6 Drawing Sheets

DISTRIBUTION DEVICE

BACKGROUND OF THE DISCLOSURE

Field of the Disclosure

The disclosure relates to distribution devices and more particularly pertains to a new feed distribution device developed for automating and metering distribution of feed in a commercial shrimp production facility utilizing a stacked shallow tank configuration but applicable to distribution of other matter over tanks, fields, pens, or the like.

SUMMARY OF THE DISCLOSURE

An embodiment of the disclosure meets the needs presented above by generally comprising an elongated support surface positioned over and extending along an elongated tank having an open top. A shuttle moves along the support surface to move along a length of the tank. A hopper to hold feed is coupled to the shuttle. A spreader is in environmental communication with the hopper to distribute feed from the hopper and a meter is operationally coupled between the hopper and the spreader for controlling an amount of the feed delivered to and distributed by the spreader.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

With reference now to the drawings, and in particular to FIGS. 1 through 6 thereof, a new feeding distribution device embodying the principles and concepts of an embodiment of the disclosure and generally designated by the reference numeral 10 will be described.

As best illustrated in FIGS. 1 through 6, the distribution device 10 generally comprises a tank 12 of the type which is conventional in commercial production of shrimp. The tank 12 is elongated and has an open top 14. As noted above, the device 10 generally may be utilized for distribution of matter other than feed and applicable to other situations than commercial shrimp operations. As such, although the term tank is used throughout the specification, the tank 12 may further represent any area, enclosed or open, onto or into which matter, including feed, nutrients, fertilizer, supplements, or the like, may be distributed. A beam 16 is positioned over the tank 12. The beam 16 is elongated and extends along a length of the tank 12. The beam 16 includes a lower flange 18 and a central flange 20. The central flange 20 is coupled to and extends perpendicularly from the lower flange 18. The lower flange 18 defines a support surface 22. The beam 16 may be an I-beam or have an inverted T-shaped cross sectional shape taken perpendicular to a longitudinal axis of the beam 16. The beam 16 may also be viewed as integrally incorporated into any structure positioned over the tank 12 such as another tank 12 in a vertically stacked orientation with the original tank 12.

A shuttle 24 is movable along the support surface 22 wherein the shuttle 24 is movable along a length of the tank 12. The shuttle 24 comprises a frame 26 and a plurality of rollers 28. The rollers 28 are coupled to the frame 26. The rollers 28 engage the beam 16 wherein the shuttle 24 is slidably coupled to the beam 16. Each roller 28 rests on a top surface 30 of the lower flange 18 of the beam 16 coextensive with the support surface 22. Each of a pair of guide wheels 30 is coupled to the frame 26 and extends from the frame 26 towards the central flange 20 of the beam 16 such that the central flange 20 of the beam 16 is positioned within a gap 32 defined between the pair of guide wheels 30. A drive wheel 34 is coupled to the frame 26. The drive wheel 34 engages the beam 16 wherein rotation of the drive wheel 34 urges the frame 26 to move along the beam 16. The drive wheel 34 engages a bottom surface 36 of the lower flange 18 of the beam 16. A drive motor 38 is coupled to the frame 26. The drive motor 38 is operationally engaged to the drive wheel 34 wherein activation of the drive motor 38 rotates the drive wheel 34 to move the shuttle 24 along the beam 16 in a selectable direction.

A load cell 40 is coupled to the frame 26. A hopper 42 is coupled to the frame 26. The hopper 42 is configured for receiving and holding feed 44. Alternatively, depending on the desired material to be distributed, the hopper 42 may hold matter other than feed 44 if so desired. The hopper 42 is pivotally coupled to the frame 26 at a position over the load cell 40 wherein the hopper 42 is gravitationally urged to rest on the load cell 40 such that the load cell 40 is configured to measure an amount of feed 44 inside the hopper 42 by pressure exerted on the load cell 40 by the hopper 42.

A spreader 46 is coupled to the frame 26. The spreader 46 is of the type conventionally known which uses a rotated disc for distribution over an adjacent area. The spreader 46 is in environmental communication with the hopper 42 wherein rotation of the spreader 42 is configured to distribute feed 44 from the hopper 42. A spreader motor 48 is coupled to the frame 26. The spreader motor 48 is operationally engaged to the spreader 46 wherein the spreader motor 48 urges the spreader 46 to rotate. The spreader motor 48 is operationally coupled to the spreader 46 such that a speed of rotation of the spreader 46 is variable wherein the spreader 46 is configured for distributing the feed 44 over a desired and selectable area. A meter 50 is coupled to the frame 26. The meter 50 is operationally coupled between the hopper 42 and the spreader 46 wherein the meter 50 is configured for controlling an amount of the feed 44 delivered to and distributed by the spreader 46. The meter 50 is also of a conventional metering design controlled by movement of components regulating an amount of material being distributed by the meter 50 and may be controlled by rotation of a component of the meter 50. A meter motor 52 is coupled to the frame 26. The meter motor 52 is operationally engaged to the meter 50 urging the meter 50 to rotate. The meter motor 52 is operationally coupled to the meter 50 such that a speed of rotation of the meter 50 is variable wherein the meter 50 is configured for controlling a rate of distribution of the feed 44 from the hopper 42. A processor 54 is coupled to the frame 26. The processor 54 is electrically and communicatively coupled to each of the drive motor 38, the spreader motor 48, and the meter motor 52 wherein the processor 54 controls movement of the shuttle 24 along the beam 16 and is configured for controlling rate and area for distribution of the feed 44 from the hopper 42. The processor 54 is also operationally coupled to the load cell 40 for receiving and processing input relating to contents of the hopper 42.

A base 56 is positioned at a first end 58 of the beam 16. The base 56 is configured for coupling to an electrical power source in a conventional manner. The base 56 has a base contact 60. A battery 62 is coupled to the shuttle 24. The battery 62 is electrically coupled to each of the processor 54, the drive motor 38, the spreader motor 48, and the meter motor 52. A shuttle contact 64 is positioned on and electrically coupled to the battery 62. The shuttle contact 64 engages the base contact 60 when the shuttle 24 is positioned at the first end 58 of the beam 16 wherein the battery 62 is configured to be charged by the electrical power source.

Figure 1:
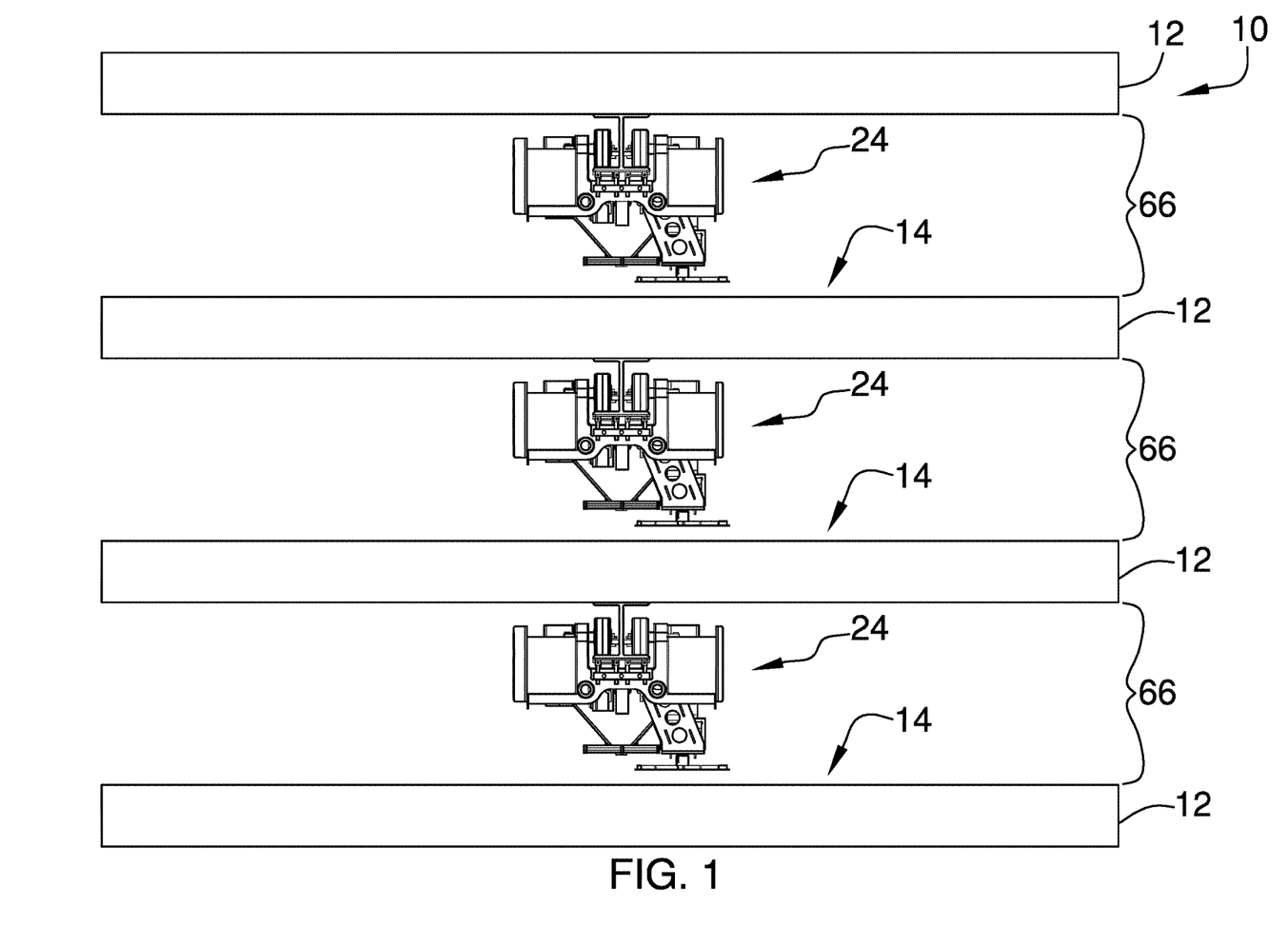
FIG. 1 is a front view of a distribution device according to an embodiment of the disclosure.
Figure 2:
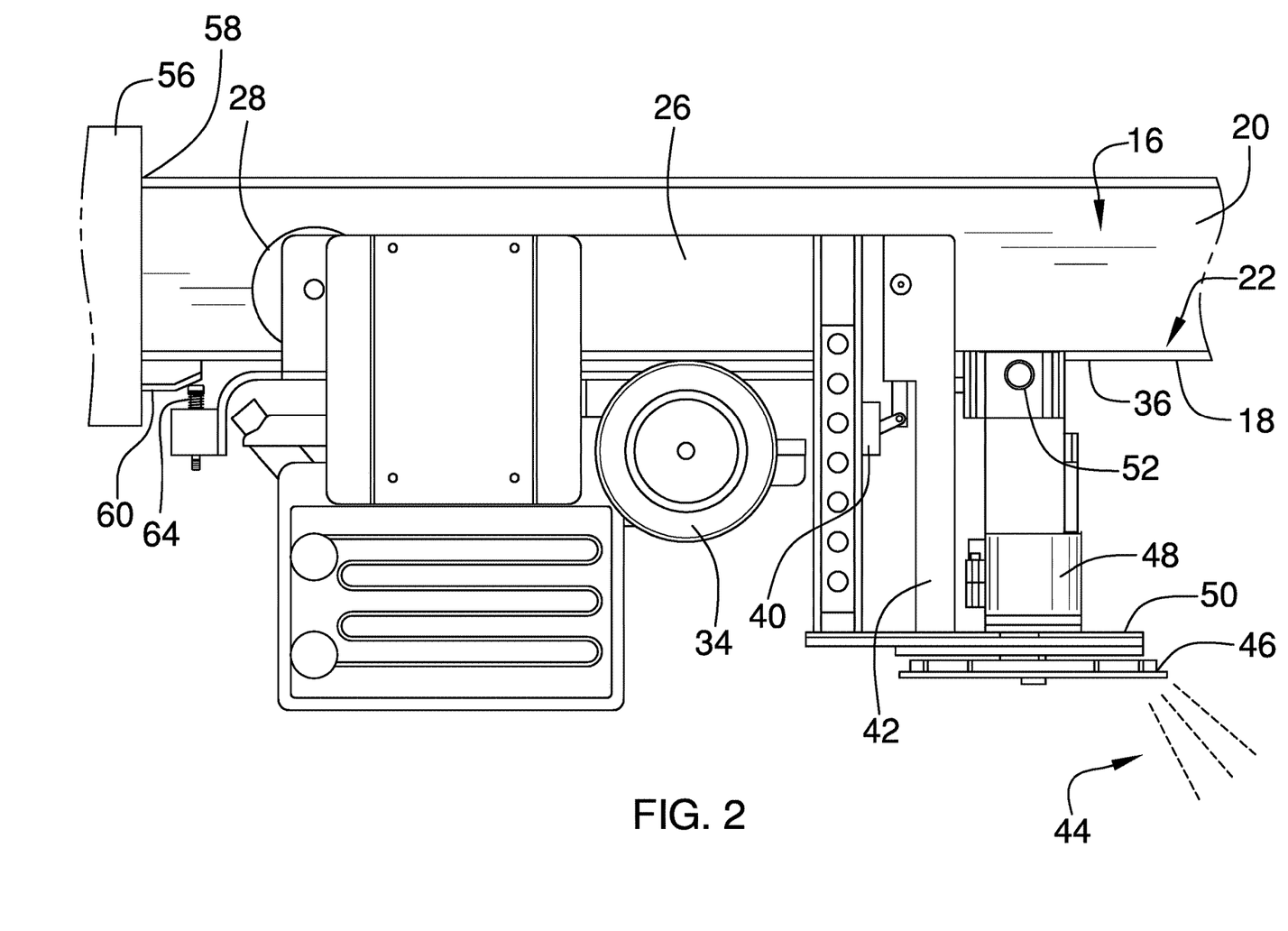
FIG. 2 is a side view of an embodiment of the disclosure.
Figure 3:
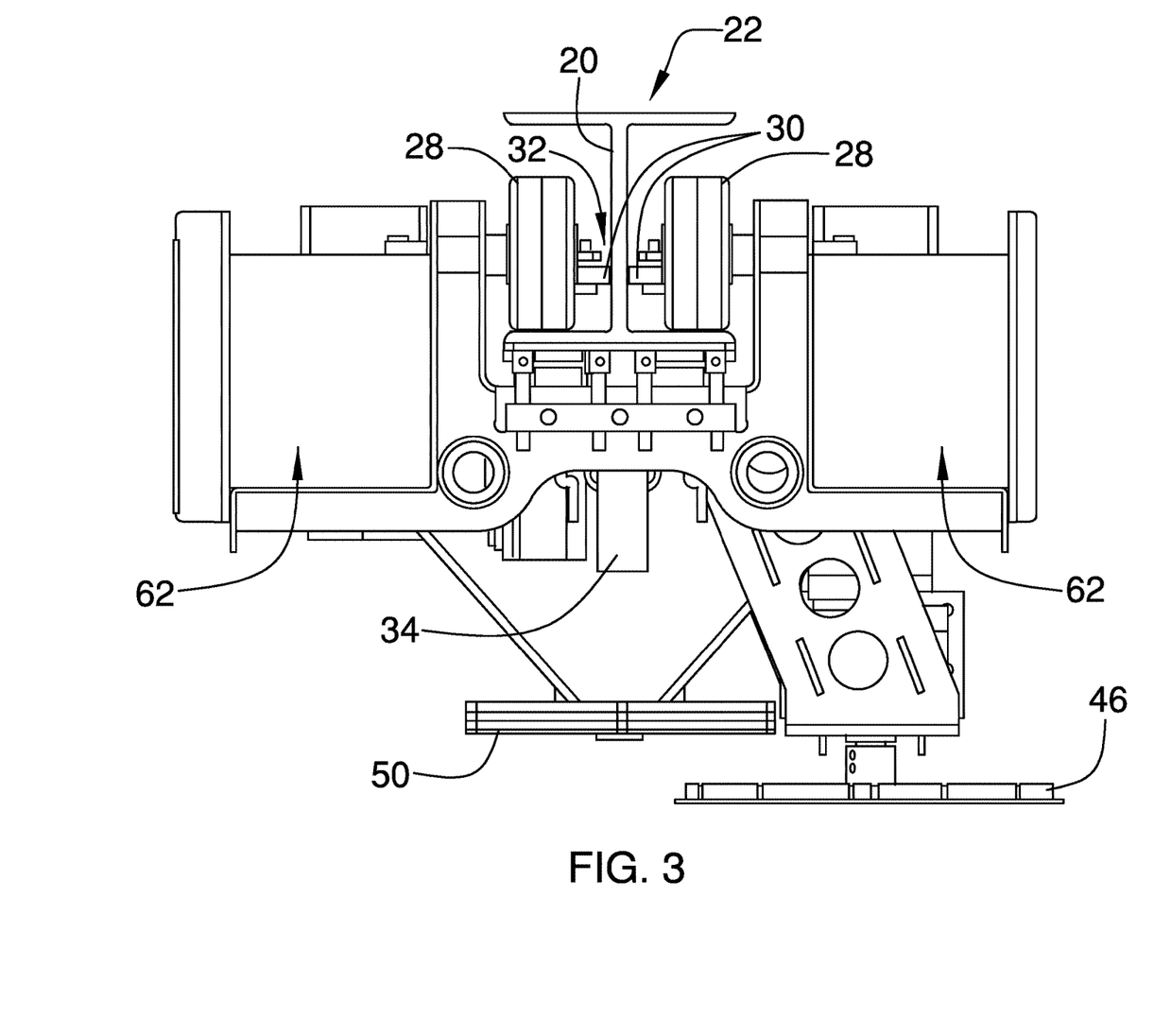
FIG. 3 is a rear view of an embodiment of the disclosure.
Figure 4:
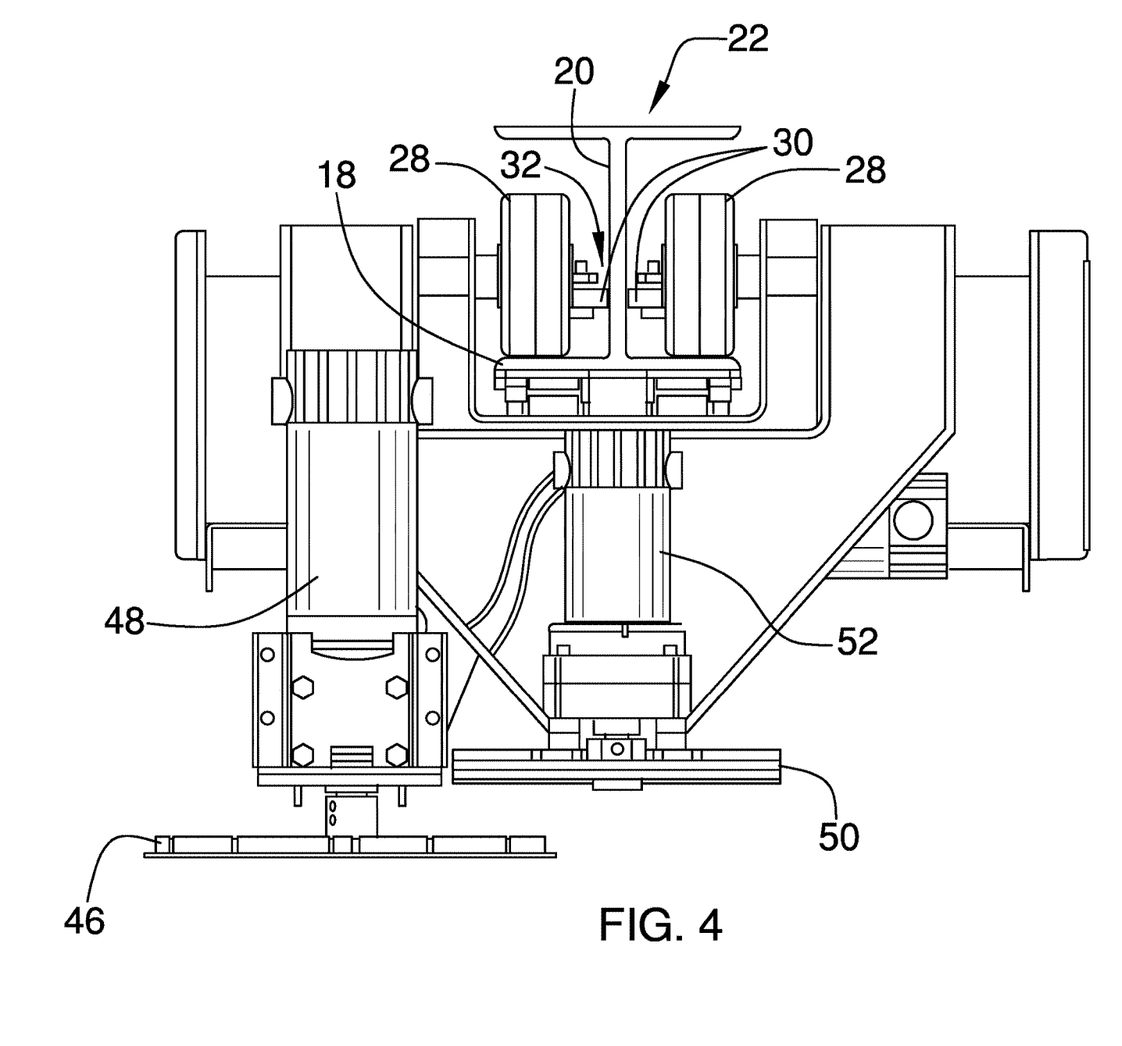
FIG. 4 is a front view of an embodiment of the disclosure.
Figure 5:
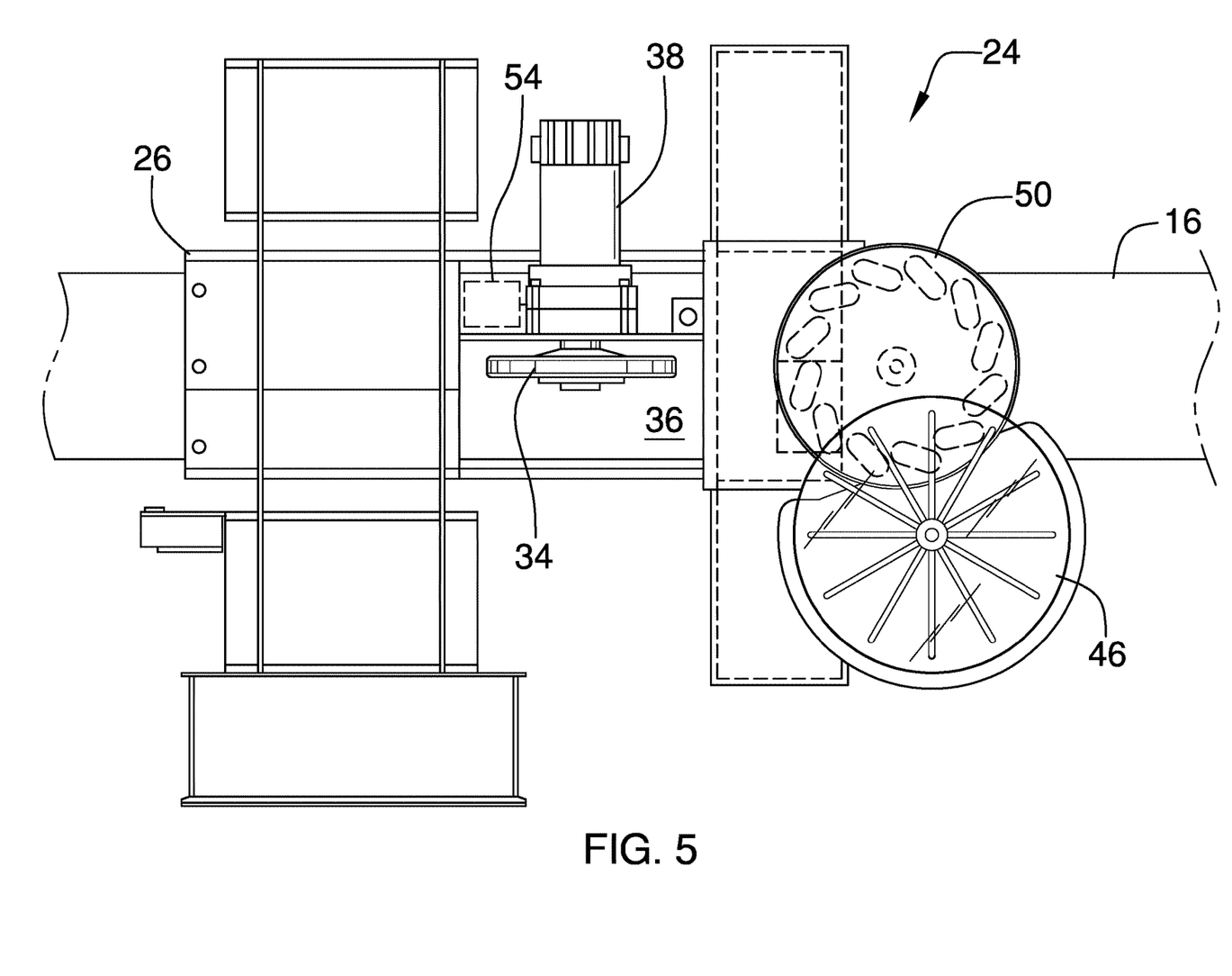
FIG. 5 is a bottom view of an embodiment of the disclosure.
Figure 6:
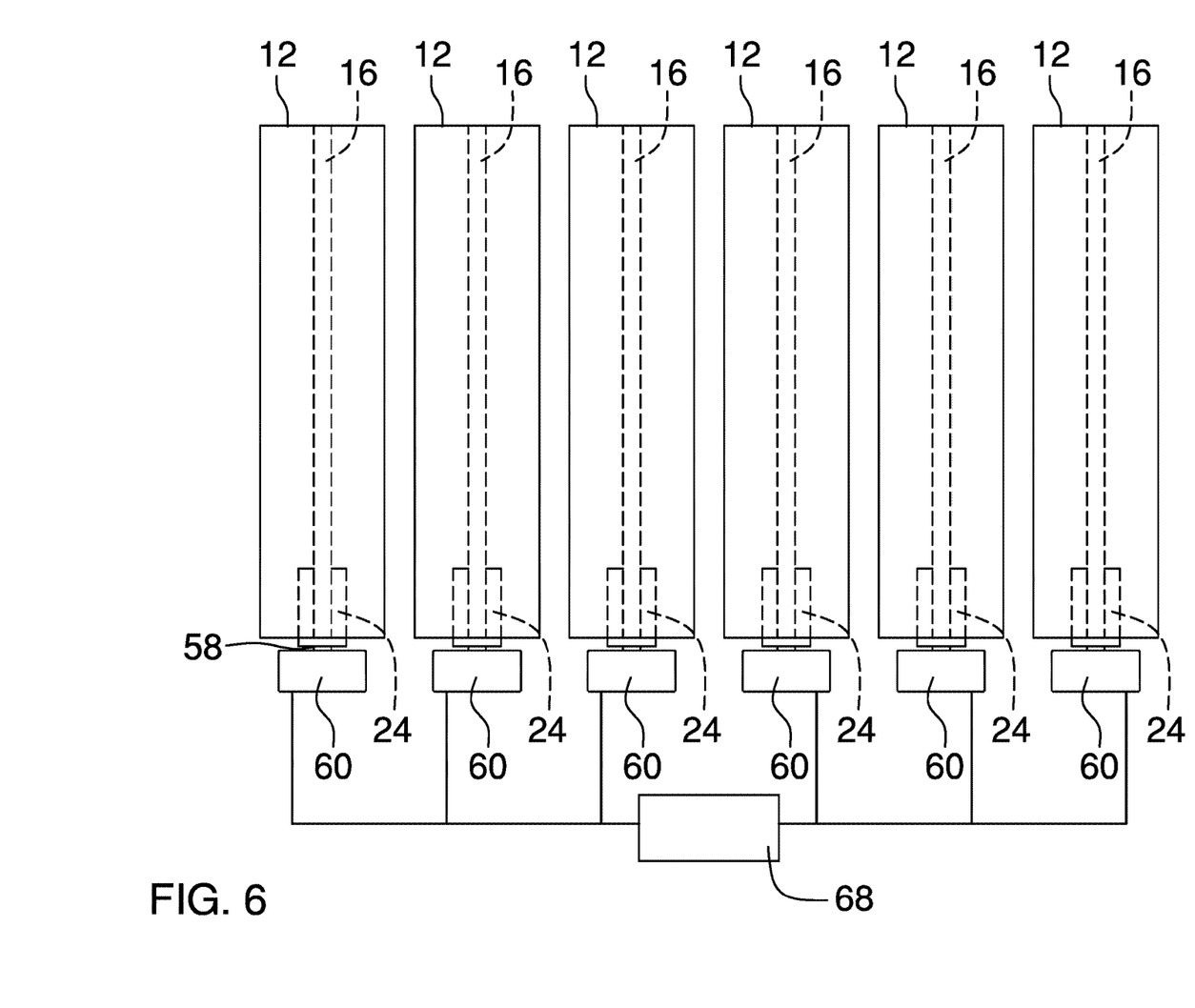
FIG. 6 is a schematic view of an embodiment of the disclosure.

In the application of a commercial shrimp production, the tank 12 is one of a plurality of tanks 12 wherein each of the tanks 12 is elongated and the tanks 12 are vertically stacked. The tanks are vertically spaced defining a clearance space 66 between adjacently stacked tanks 12. To optimize production in a given space, the clearance space is typically no greater than 20 inches. In this application, the support surface 22 is one of a plurality of support surfaces 22, each support surface 22 being positioned over an associated one of the tanks 12. Each support surface 22 extends along a length of the associated tank 12. The shuttle 24 is one of a plurality of shuttles 24, each shuttle 24 being movable along an associated one of the support surfaces 22. A processing center 68 is operationally and communicatively coupled to each processor 54 wherein the processing center 68 is configured to monitor and control operation of each shuttle 24 and distribution of the feed 44. The tanks 12 may be further arranged into laterally aligned vertical stacks, as shown in FIG. 6, or in any other configuration desired. The processing center 68 may be utilized for tracking of distribution history, monitoring actual distribution amounts based on load cell measurements, and may coordinate distribution from each shuttle.

In use, the device 10 may be incorporated and utilized for metered and controlled distribution over any area, tank, pen, or field but is designed primarily to fit within the confines of spacing between vertically stacked tanks in a commercial shrimp production facility. The processing center 68 may be used to coordinate operation of each shuttle 24 for distribution of feed 44 into the tanks 12. The overall system may be automated for metered distribution over time 24 hours per day or limited to distinct amounts at distinct times. The operation may further be coordinated with other factors such as water quality or any other measurable input which may influence when and how much matter is to be distributed. It is also contemplated that structures may be put into place for automated filling of each hopper 42.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A commercial shrimp production feed distribution device comprising:
   an elongated tank having an open top and being configured to hold water wherein said tank is configured for shrimp production;
   a support surface, said support surface being elongated and positioned over and extending along said elongated tank; and
   a shuttle, said shuttle being movable along said support surface wherein said shuttle is movable along a length of said tank, said shuttle comprising
      a frame,
      a hopper coupled to said frame, said hopper being configured for receiving and holding feed,
      a spreader coupled to said frame, said spreader being in environmental communication with said hopper wherein rotation of said spreader is configured to distribute feed from said hopper, and
      a meter coupled to said frame, said meter being operationally coupled between said hopper and said spreader wherein said meter is configured for controlling an amount of the feed delivered to and distributed by said spreader, and
   said tank being one of a plurality of tanks, each of said tanks being elongated, said tanks being vertically stacked, said tanks being vertically spaced defining a clearance space between adjacently stacked tanks, each said tank having an open top, each of said tanks having a longitudinal axis;
   said support surface being one of a plurality of support surfaces, each support surface being positioned over an associated one of said tanks, each support surface extending along a length of said associated tank; and
   said shuttle being one of a plurality of shuttles, each shuttle being movable along an associated one of said support surfaces, each said shuttle having a respective processor, each shuttle being positioned on the associated one of the support surfaces directly above the longitudinal axis of the associated one of the tanks.

2. The device of claim 1, further comprising:
said support surface being a top surface of a lower flange of a beam; and
said shuttle further comprising
a plurality of rollers, said rollers being coupled to said frame, said rollers resting on said top surface,
a drive wheel coupled to said frame, said drive wheel engaging said beam wherein rotation of said drive wheel urges said shuttle to move along said beam, and
a drive motor, said drive motor being coupled to said frame, said drive motor being operationally engaged to said drive wheel wherein activation of said motor rotates said drive wheel to move said shuttle along said beam in a selectable direction.

3. The device of claim 1, said shuttle further comprising:
a load cell coupled to said frame; and
said hopper being pivotally coupled to said frame at a position over said load cell wherein said hopper rests on said load cell such that said load cell is configured to measure an amount of feed inside said hopper by pressure exerted on said load cell by said hopper.

4. The device of claim 1, said shuttle further comprising a meter motor coupled to said frame, said meter motor being operationally engaged to said meter wherein said meter motor urges said meter to rotate, said meter motor being operationally coupled to said meter such that a speed of rotation of said meter is variable wherein said meter is configured for controlling a rate of distribution of the feed from said hopper.

5. The device of claim 1, said shuttle further comprising a spreader motor coupled to said frame, said spreader motor being operationally engaged to said spreader wherein said spreader motor urges said spreader to rotate, said spreader motor being operationally coupled to said spreader such that a speed of rotation of said spreader is variable wherein said spreader is configured for distributing the feed over a desired area.

6. The device of claim 2, further comprising:
a base positioned at a first end of said beam, said base being configured for coupling to an electrical power source, said base having a base contact;
a battery coupled to said shuttle, said battery being electrically coupled said drive motor;
a shuttle electrical contact, said shuttle contact being electrically coupled to said battery, said shuttle contact engaging said base contact when said shuttle is positioned at said first end of said beam wherein said battery is configured to be charged by the electrical power source.

7. The device of claim 4, further comprising:
said support surface being a top surface of a lower flange of an I-beam;
wherein an entirety of said shuttle is positioned spaced below a lower surface of an upper flange of said I-beam;
a base positioned at a first end of said beam, said base being configured for coupling to an electrical power source, said base having a base contact;
a battery coupled to said shuttle, said battery being electrically coupled said meter motor;
a shuttle electrical contact, said shuttle contact being electrically coupled to said battery, said shuttle contact engaging said base contact when said shuttle is positioned at said first end of said beam wherein said battery is configured to be charged by the electrical power source.

8. The device of claim 1, further comprising:
said support surface being a top surface of a lower flange of an I-beam;
wherein an entirety of said shuttle is positioned spaced below a lower surface of an upper flange of said I-beam; and
said shuttle further comprising
a plurality of rollers, said rollers being coupled to said frame, said rollers engaging said beam wherein said shuttle is slidably coupled to said beam,
a drive wheel coupled to said frame, said drive wheel engaging said beam wherein rotation of said drive wheel urges said shuttle to move along said beam,
a drive motor, said drive motor being coupled to said frame, said drive motor being operationally engaged to said drive wheel wherein activation of said motor rotates said drive wheel to move said shuttle along said beam in a selectable direction,
a spreader motor coupled to said frame, said spreader motor being operationally engaged to said spreader wherein said spreader motor urges said spreader to rotate, said spreader motor being operationally coupled to said spreader such that a speed of rotation of said spreader is variable wherein said spreader is configured for distributing the feed over a desired area, and
a meter motor coupled to said frame, said meter motor being operationally engaged to said meter wherein said meter motor urges said meter to rotate, said meter motor being operationally coupled to said meter such that a speed of rotation of said meter is variable wherein said meter is configured for controlling a rate of distribution of the feed from said hopper.

9. The device of claim 8, said shuttle further comprising a processor coupled to said frame, said processor being electrically and communicatively coupled to each of said drive motor, said spreader motor, and said meter motor wherein said processor controls movement of said shuttle along said beam and is configured for controlling rate and area for distribution of the feed from said hopper.

10. The device of claim 9, further comprising:
a base positioned at a first end of said beam, said base being configured for coupling to an electrical power source, said base having a base contact;
a battery coupled to said shuttle, said battery being electrically coupled to each of said processor, said drive motor, said spreader motor, and said meter motor;
a shuttle electrical contact, said shuttle contact being electrically coupled to said battery, said shuttle contact engaging said base contact when said shuttle is positioned at said first end of said beam wherein said battery is configured to be charged by the electrical power source.

11. The device of claim 2, further comprising said beam including said lower flange and a central flange, said central flange being coupled to and extending perpendicularly from said lower flange.

12. The device of claim 11, said shuttle further comprising a pair of guide wheels, each said guide wheel being coupled to said frame and extending from said frame towards said central flange of said beam such that said central flange of said beam is positioned within a gap defined between said pair of guide wheels.

13. The device of claim 11, further comprising said drive wheel engaging a bottom surface of said lower flange of said beam.

14. The device of claim 1, further comprising said clearance space being no greater than 20 inches.

15. The device of claim 1, further comprising a total height of said shuttle being less than 20 inches wherein said shuttle is configured to fit between vertically stacked tanks.

16. The device of claim 1, further comprising a processing center, said processing center being operationally and communicatively coupled to each said processor wherein said processing center is configured to monitor and control operation of each said shuttle and distribution of the feed.

17. A commercial shrimp production feed distribution system comprising:

a tank, said tank being elongated, said tank having an open top and being configured to hold water wherein said tank is configured for shrimp production, the tank having a longitudinal axis;

a beam, said beam being positioned over said tank, said beam being elongated and extending along a length of said tank, said beam including a lower flange and a central flange, said central flange being coupled to and extending perpendicularly from said lower flange, said lower flange defining a support surface;

a shuttle, said shuttle being movable along said support surface wherein said shuttle is movable along a length of said tank, the shuttle being positioned directly above the longitudinal axis of the tank, said shuttle comprising a frame, a plurality of rollers, said rollers being coupled to said frame, said rollers engaging said beam wherein said shuttle is slidably coupled to said beam, each said roller resting on a top surface of said lower flange of said beam, a pair of guide wheels, each said guide wheel being coupled to said frame and extending from said frame towards said central flange of said beam such that said central flange of said beam is positioned within a gap defined between said pair of guide wheels, a drive wheel coupled to said frame, said drive wheel engaging said beam wherein rotation of said drive wheel urges said frame to move along said beam, said drive wheel engaging a bottom surface of said lower flange of said beam, a drive motor, said drive motor being coupled to said frame, said drive motor being operationally engaged to said drive wheel wherein activation of said motor rotates said drive wheel to move said shuttle along said beam in a selectable direction, a load cell coupled to said frame, a hopper coupled to said frame, said hopper being configured for receiving and holding feed, said hopper being pivotally coupled to said shuttle at a position over said load cell wherein said hopper rests on said load cell such that said load cell is configured to measure an amount of feed inside said hopper by pressure exerted on said load cell by said hopper, a spreader coupled to said frame, said spreader being in environmental communication with said hopper wherein rotation of said spreader is configured to distribute feed from said hopper, a spreader motor coupled to said frame, said spreader motor being operationally engaged to said spreader wherein said spreader motor urges said spreader to rotate, said spreader motor being operationally coupled to said spreader such that a speed of rotation of said spreader is variable wherein said spreader is configured for distributing the feed over a desired area, a meter coupled to said frame, said meter being operationally coupled between said hopper and said spreader wherein said meter is configured for controlling an amount of the feed delivered to and distributed by said spreader, a meter motor coupled to said frame, said meter motor being operationally engaged to said meter wherein said meter motor urges said meter to rotate, said meter motor being operationally coupled to said meter such that a speed of rotation of said meter is variable wherein said meter is configured for controlling a rate of distribution of the feed from said hopper, and a processor coupled to said frame, said processor being electrically and communicatively coupled to each of said drive motor, said spreader motor, and said meter motor wherein said processor controls movement of said shuttle along said beam and is configured for controlling rate and area for distribution of the feed from said hopper;

a base positioned at a first end of said beam, said base being configured for coupling to an electrical power source, said base having a base contact;

a battery coupled to said shuttle, said battery being electrically coupled to each of said processor, said drive motor, said spreader motor, and said meter motor;

a shuttle electrical contact, said shuttle contact being electrically coupled to said battery, said shuttle contact engaging said base contact when said shuttle is positioned at said first end of said beam wherein said battery is configured to be charged by the electrical power source;

said tank being one of a plurality of tanks, each of said tanks being elongated, said tanks being vertically stacked, said tanks being vertically spaced defining a clearance space between adjacently stacked tanks, said clearance space being no greater than 20 inches, each said tank having an open top;

said support surface being one of a plurality of support surfaces, each support surface being positioned over an associated one of said tanks, each support surface extending along a length of said associated tank;

said shuttle being one of a plurality of shuttles, each shuttle being movable along an associated one of said support surfaces; and a processing center, said processing center being operationally and communicatively coupled to each said processor wherein said processing center is configured to monitor and control operation of each said shuttle and distribution of the feed.

* * * * *